No. 644,359. Patented Feb. 27, 1900.
L. KOEHN.
PLOW ATTACHMENT.
(Application filed Aug. 4, 1899.)

(No Model.)

WITNESSES:
David E. Carlsen
E. C. Carlsen

INVENTOR:
Lebrecht Koehn
BY his ATTORNEY.
A. M. Carlsen.

UNITED STATES PATENT OFFICE.

LEBRECHT KOEHN, OF BLACKWELL, MISSOURI.

PLOW ATTACHMENT.

SPECIFICATION forming part of Letters Patent No. 644,359, dated February 27, 1900.

Application filed August 4, 1899. Serial No. 726,143. (No model.)

*To all whom it may concern:*

Be it known that I, LEBRECHT KOEHN, a citizen of the United States, residing at Blackwell, in the county of St. François and State of Missouri, have invented certain new and useful Improvements in Plow Attachments; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in attachments for plows; and the objects of the invention are, first, to provide an effective plow attachment for folding down and causing to be properly covered in the furrow the green crops which are often plowed down as fertilizers and the weeds and stubble often plowed in; second, to make the aforesaid attachment adjustable to the various sizes of plows ordinarily used. These and other objects I attain by the novel construction and arrangement of parts illustrated in the accompanying drawings, in which—

Figure 1:
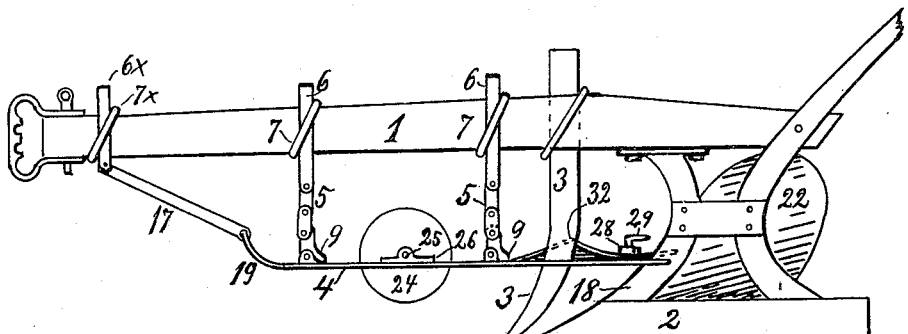
Figure 2:
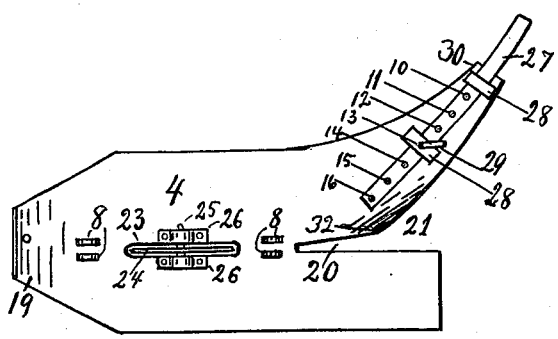
Figure 3:

Figure 1 is a side elevation of a plow provided with my attachment. Fig. 2 is a top or plan view of the main portion or plate of the attachment detached from its connections with the plow. Fig. 3 is a rear view of one of the clips by which the attachment is secured in an adjustable manner to the plow.

Referring to the various parts in the drawings by reference-numerals, 1 is the beam, 2 the landside, and 3 the common colter, of an ordinary plow.

My attachment consists of the shoe, runner, or plate 4, which is curved upward at its front end and is suspended from the beam 1 by the two chains 5, each of which has its upper end provided with an extra-long link or bar 6, which is adjustably secured to the beam by the clip 7, while the lowest link of the chain is pivoted between the lips 8 of the plate 4 and is provided with a toe 9, which touches the plate and prevents the link from assuming an entirely-plumb position, which position might cause all the links in the chain to get a dead-center line, and thereby prevent the required free motion up and down of the plate 4.

17 is the link or rod by which the plate 4 is drawn. This rod may be a chain of either the flat-linked type 5, which prevents side motion or tilting of the plate, or of any ordinary type of chain; but I prefer using a rod, so that the plate will never slip forward and lose its guidance on the colter 3 or on the share 18 of the plow when the plow has no colter, as is often the case.

The plate 4, as already stated, is curved upward at its front end, so as to slide like a runner and fold the weeds and crop down under it.

20 is a slot or deep notch in the rear portion of the plate for the colter 3, where it is used to pass down through, while 21 is a V-shaped notch adapted to straddle the front end or edge 18 of the plowshare.

In a slot 23, near the middle of the plate 4, I mount on the shaft 25, which is journaled in the boxes 26, secured upon the plate, a small sharp-edged rolling colter 24, which projects downward below the plate and serves to cut and sever the weeds and crop pressed down by the plate, and thus prevents clogging at the colter 3 or the edge 18.

27 is a bar slidingly inserted in the keepers 28, in which it may be securely held at any desired point by the thumb set-screw 29, the point of which enters either of the cavities 10, 11, 12, 13, 14, 15, and 16, and thereby holds the outer end of the bar 27 more or less extended beyond the outwardly-curved arm 30 of the plate, so that the attachment is adjustable in width to any-sized plow from the ten-inch to the sixteen-inch sizes, both inclusive.

In operation, if the attachment is used on a twelve-inch plow, the bar 27 should be placed with its cavity 12 under the set-screw 29. If used on a sixteen-inch plow, the cavity 16 should be under the screw, and so on for any size of plow. If the plowing is more or less deep, the plate 4 may be raised or lowered, as well as moved more or less forward, by moving the bars or pieces 6 and 6× under the clamps or clips 7 and 7×, which for that purpose may be loosened and tightened again by the nuts 31.

The corner 32 of the plate 4 is curved upward, as best shown in Fig. 1, to conform to the raising of the soil near the front of the plow, while the main portion of the arm 30 and its extensible bar 27 assume a substantially-horizontal position, and by extending about parallel to the moldboard keeps the crop and weeds down until the soil turned by the moldboard overtakes and covers them.

Having thus described my invention, what I claim, and desire to secure by Letters Patent, is—

1. A plow attachment consisting of a broad, runner-shaped plate or shoe, adapted to be drawn on the ground below the plow-beam, and having up-and-down yielding connections with the beam, substantially as and for the purpose set forth.

2. A plow attachment consisting of a broad, runner-shaped plate or shoe, adapted to be drawn on the ground below the plow-beam, and having yielding and adjustable connections with the plow-beam, substantially as and for the purpose set forth.

3. A plow attachment consisting of a broad, runner-shaped plate or shoe, suspended from the plow-beam, so as to be drawn on the ground in front of the plow proper; said plate having an arm extending from it in front of and about parallel to the moldboard, substantially as and for the purpose set forth.

4. A plow attachment consisting of a broad, runner-shaped plate or shoe, suspended from the plow-beam and adapted to be drawn on the ground in front of the plow proper; said plate having an extensible arm or portion by which to broaden the plate in front of the moldboard, substantially as and for the purpose set forth.

5. A plow attachment consisting of a broad, runner-shaped plate or shoe adapted to be suspended from the plow-beam and drag on the ground in front of the plow proper; said plate having near its middle a slot, and a rolling colter journaled on the plate and projecting down through the slot, substantially as and for the purpose set forth.

In testimony whereof I affix my signature in presence of two witnesses.

LEBRECHT KOEHN.

Witnesses:
 FR. A. THEUER,
 C. HINCK.